United States Patent
Dubey

(10) Patent No.: US 8,826,426 B1
(45) Date of Patent: Sep. 2, 2014

(54) SYSTEMS AND METHODS FOR GENERATING REPUTATION-BASED RATINGS FOR UNIFORM RESOURCE LOCATORS

(75) Inventor: Himanshu Dubey, Madhya Pradesh (IN)

(73) Assignee: Symantec Corporation, Mountain View, CA (US)

( * ) Notice: Subject to any disclaimer, the term of this patent is extended or adjusted under 35 U.S.C. 154(b) by 150 days.

(21) Appl. No.: 13/101,472

(22) Filed: May 5, 2011

(51) Int. Cl.
    H04L 29/06 (2006.01)
(52) U.S. Cl.
    CPC ............ H04L 63/14 (2013.01); H04L 63/1433 (2013.01); H04L 63/1441 (2013.01)
    USPC .................................. 726/22; 726/23; 726/25
(58) Field of Classification Search
    CPC .. H04L 63/14; H04L 63/1433; H04L 63/1441
    USPC ................................................ 726/1–25, 251
    See application file for complete search history.

(56) References Cited

U.S. PATENT DOCUMENTS

| | | | |
|---|---|---|---|
| 6,169,805 B1 * | 1/2001 | Dunn et al. .................... | 380/277 |
| 7,269,851 B2 * | 9/2007 | Ackroyd .......................... | 726/24 |
| 7,818,343 B1 * | 10/2010 | Sekhar et al. ................. | 707/781 |
| 7,831,412 B1 * | 11/2010 | Sobel et al. .................... | 702/186 |
| 2005/0283831 A1 | 12/2005 | Ryu et al. | |
| 2006/0095586 A1 * | 5/2006 | Adelman et al. ............. | 709/245 |
| 2006/0253584 A1 * | 11/2006 | Dixon et al. .................. | 709/225 |
| 2007/0208940 A1 * | 9/2007 | Adelman et al. ............. | 713/168 |
| 2008/0028100 A1 * | 1/2008 | Adelman et al. ............. | 709/245 |
| 2008/0109245 A1 * | 5/2008 | Gupta ............................. | 705/1 |
| 2008/0109491 A1 * | 5/2008 | Gupta ....................... | 707/104.1 |
| 2010/0114744 A1 * | 5/2010 | Gonen ............................ | 705/35 |
| 2010/0192196 A1 * | 7/2010 | Lee .................................. | 726/1 |
| 2011/0185436 A1 * | 7/2011 | Koulinitch et al. ............. | 726/28 |

OTHER PUBLICATIONS

Sourabh Satish; Systems and Methods for Determining and Quantifying the Impact of an Application on the Health of a System; U.S. Appl. No. 12/049,751, filed Mar. 17, 2008.
Sourabh Satish; Systems and Methods for Determining the Health Impact of an Application Based on Information Obtained From Like-Profiled Computing Systems; U.S. Appl. No. 12/056,379, filed Mar. 27, 2008.
Sourabh Satish; Social Trust Based Security Model; U.S. Appl. No. 11/394,846, filed Mar. 31, 2006.

(Continued)

*Primary Examiner* — Catherine Thiaw
*Assistant Examiner* — Don Zhao
(74) *Attorney, Agent, or Firm* — ALG Intellectual Property, LLC

(57) ABSTRACT

An exemplary computer-implemented method for generating reputation ratings for URLs may include (1) identifying a URL that identifies the location of at least one web resource, (2) identifying the computing health of at least one member of a computing community that has accessed the URL, (3) generating, based at least in part on the computing health of the member(s) that accessed the URL, a reputation rating for the URL that indicates whether the URL represents a potential security risk, and then (4) providing the reputation rating for the URL to at least one additional computing device to enable the additional computing device to evaluate whether the URL represents a potential security risk. In addition, a client-side, computer-implemented method for determining whether a URL represents a potential security risk may be based at least in part on such a reputation rating. Various other methods, systems, and computer-readable media are also disclosed.

19 Claims, 8 Drawing Sheets

(56) References Cited

OTHER PUBLICATIONS

Non-Final Office Action Received in Related U.S. Appl. No. 11/394,846, Mar. 6, 2009.
Final Office Action Received in Related U.S. Appl. No. 11/394,846, Sep. 1, 2009.
Non-Final Office Action Received in Related U.S. Appl. No. 11/394,846, Feb. 23, 2010.
Final Office Action Received in Related U.S. Appl. No. 11/394,846, Jul. 22, 2010.
Non-Final Office Action Received in Related U.S. Appl. No. 11/394,846, Dec. 9, 2010.
Carey Nachenberg; Systems and Methods for Using Reputation Data to Detect Shared-Object-Based Security Threats; U.S. Appl. No. 12/415,834, filed Mar. 31, 2009.
Daniel Asheghian; Methods and Systems for Evaluating the Health of Computing Systems Based on When Operating-System Changes Occur; U.S. Appl. No. 12/476,782, filed Jun. 2, 2009.
William E. Sobel; Systems and Methods for Digitally Signing Executables with Reputation Information; U.S. Appl. No. 12/858,085, filed Aug. 17, 2010.

* cited by examiner

Computing-Health Assessment 500

| Security Information 510 | |
|---|---|
| Malware Items Detected | 0 |
| Malware Items Quarantined | 1 |
| Malware Infections | 1 |

512 } 514

| Performance Information 520 | |
|---|---|
| Running Average of CPU Usage | 8% |
| Maximum CPU Usage | 39% |
| Running Average of Page Faults | 248.4375 |
| Maximum Number of Page Faults | 844 |
| Running Average of IP Datagrams | 39.78 |
| Maximum Number of IP Datagrams | 57 |

522 } 524

| Stability Information 530 | |
|---|---|
| Blue-Screen Errors | 0 |
| Service Errors | 1 |
| Application Errors | 2 |

SYSTEMS AND METHODS FOR GENERATING REPUTATION-BASED RATINGS FOR UNIFORM RESOURCE LOCATORS

BACKGROUND

Security researchers estimate that the majority of malicious software ("malware") generated today is deployed and/or proliferated via the Internet. In recent years, malware developers have attempted to avoid detection by hosting malware on websites that only remain active for a short period of time or by posting links to such sites on legitimate websites. Because many existing computing-security technologies detect malicious websites by (1) statically scanning the contents of a suspicious website, (2) determining that the content hosted by the website is malicious, and then (3) generating a unique digital signature or fingerprint for the website and/or content for use in later identifying the website and/or content (a technique known as blacklisting), conventional computing-security technologies have struggled to protect computing resources from such attacks due to their inability to quickly and correctly create digital signatures for each of the thousands or potentially millions of variations of new websites or content generated daily by malware developers.

Due to these limitations, some security-software vendors have turned to whitelisting technologies. In a whitelisting system, computing systems may only access websites identified on a preapproved whitelist. Security-software vendors may create whitelists either manually or automatically, such as through the use of web-spidering techniques. However, given the high number of new websites and files created and published on a daily basis, many security-software vendors have struggled with manually creating comprehensive website whitelists. Moreover, many automatic techniques for creating whitelists only identify a portion of known legitimate websites. Conventional automatic techniques are also prone to falsely identifying illegitimate websites as legitimate, and vice-versa, further limiting the viability of a whitelist generated using such a technique. As such, the instant disclosure identifies a need for improved systems and methods for identifying malicious websites.

SUMMARY

As will be described in greater detail below, the instant disclosure attempts to solve the above-identified problems by disclosing a reputation-based rating system for uniform resource locators (URLs) that may be used to evaluate the potential security risk of a URL. In one embodiment, the exemplary systems described herein may generate reputation-based ratings for URLS by (1) identifying a URL that identifies the location of at least one web resource (such as a file), (2) identifying the computing health of at least one member of a computing community that has accessed the URL, (3) generating, based at least in part on the computing health of the member(s) that accessed the URL, a reputation rating for the URL that indicates whether the URL represents a potential security risk, and then (4) providing the reputation rating for the URL to at least one additional computing device (such as an end-user's machine) to enable the additional computing device to evaluate whether the URL represents a potential security risk.

In one example, the computing health of the member(s) that accessed the URL may be represented using a computing-health score that is based at least in part on an evaluation of the performance, stability, and/or state of security of at least one computing device of the member(s) in question. In addition, in some embodiments the reputation rating may, in addition to being based at least in part on the computing health of the member(s) that accessed the URL, be based at least in part on one or more additional factors, such as the total number of members within the computing community that have accessed the URL in question (where, e.g., a relatively low number, such as less than 10, may indicate that the URL is potentially malicious), the age of the URL (where, e.g., a relatively new URL may indicate that the URL is potentially malicious), at least one attribute of a web domain associated with the URL (such as the reputation of a top-level domain associated with the URL, where a relatively low reputation of the top-level domain may indicate that the URL is potentially malicious), at least one attribute of the web resource or resources identified by the URL (such as a trustworthiness classification or reputation rating assigned to a file identified by the URL, where a low reputation assigned to the file may indicate that the URL is potentially malicious), at least one attribute of a server associated with the URL (such as a reputation rating assigned to a domain name server associated with the URL, where a low reputation rating of the domain name server may indicate that the URL is potentially malicious), at least one attribute of a registrar associated with the URL (such as a reputation rating of a registrar of the URL, where a low reputation rating of the registrar may indicate that the URL is potentially malicious), or any other factor or attribute that may be useful in determining whether the URL represents a potential security risk.

In some examples, the systems described herein may use the generated reputation rating to verify the accuracy of a separate trustworthiness classification assigned to the URL in question (such as a trustworthiness classification assigned to the URL using a signature and/or heuristic-based approach). In this example, by comparing the reputation rating with the separate trustworthiness classification, the potential for and/or frequency of false positives generated by each approach may be reduced.

The instant disclosure also discloses client-side systems and methods for using reputation ratings generated in accordance with the steps outlined herein to determine whether URLs encountered by end-users represent potential security risks. In one example, the client-side systems described herein may accomplish such a task by (1) detecting an attempt to access a URL that identifies the location of at least one web resource, (2) obtaining a reputation rating for the URL from a reputation service, (3) determining, based at least in part on the reputation rating obtained from the reputation service, that the URL represents a potential security risk, and then (4) blocking the attempt to access the URL. In this example, the reputation rating obtained from the reputation service may indicate whether the URL in question represents a potential security risk and may be based at least in part on the computing health of at least one member of a computing community that has previously accessed the URL.

In some examples, the client-side systems described herein may determine that the URL in question represents a potential security risk if the reputation rating obtained from the reputation service falls below a predetermined threshold (e.g., "50%"). In other examples, the client-side systems described herein may use the reputation rating obtained from the reputation service in combination with a separate trustworthiness classification assigned to the URL in question (such as a trustworthiness classification assigned to the URL using a signature and/or heuristic-based approach) to determine whether the URL represents a potential security risk. For example, the client-side systems described herein may use the reputation rating obtained from the reputation service to verify the accuracy of a separate trustworthiness classification assigned to the URL that was based at least in part on a static analysis of at least one attribute of the URL.

As will be explained in greater detail below, by collecting, aggregating, and analyzing data relative to URLs accessed by potentially millions of user devices within a computing community, such as a security-software vendor's user base (for example, by determining whether a URL has been accessed by a relatively low number of machines within the community or whether the URL has been predominantly accessed by at-risk or "unhealthy" machines within the community, among other details), the systems and methods described herein may enable security-software publishers to generate reputation ratings for URLs that provide fairly accurate estimations as to whether the URLs represent potential security risks. In addition, by deploying such reputation ratings to security software residing on end-users' machines, the systems and methods described herein may enable security software to reliably detect and block access to malicious URLs encountered by end-users, even if a particular end-user represents one of the first (or the first) end-user to encounter a particular URL. Moreover, by comparing such reputation ratings with separate URL trustworthiness classifications (generated using, e.g., signature or heuristic-based classification techniques), the potential for and/or frequency of false positives generated by each technique may be reduced.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary computing-health assessment.

Figure 1:
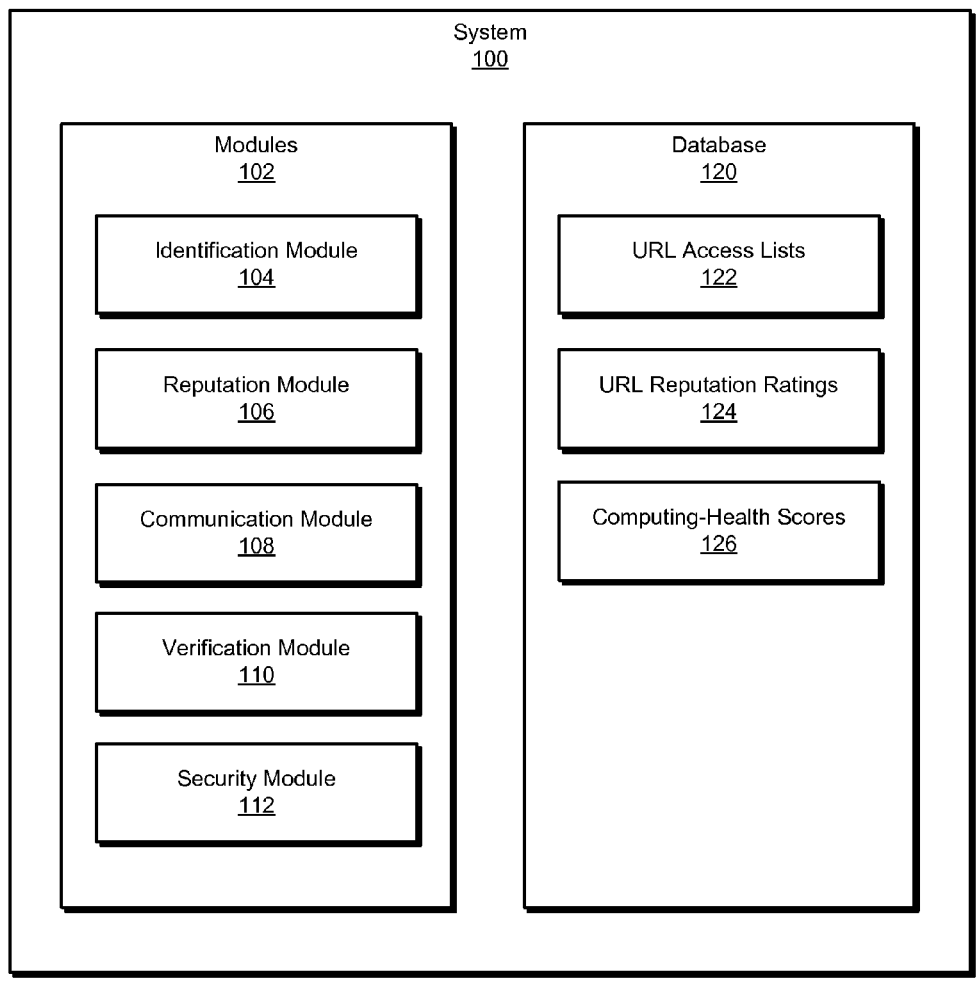
FIG. 1 is a block diagram of an exemplary system for generating reputation ratings for URLs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for generating reputation ratings for URLs. The following will provide, with reference to FIGS. 1-2, detailed descriptions of exemplary systems for generating reputation ratings for URLs. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for generating reputation ratings for URLs. As illustrated in this figure, exemplary system 100 may include one or more modules 102 for performing one or more tasks. For example, and as will be explained in greater detail below, exemplary system 100 may include an identification module 104 programmed to identify a URL that identifies the location of at least one web resource. Exemplary system 100 may also include a reputation module 106 programmed to generate a reputation rating for the URL based at least in part on the computing health of at least one member of a computing community that has accessed the URL. In addition, and as will be described in greater detail below, exemplary system 100 may include a communication module 108 programmed to provide the reputation rating for the URL to at least one additional computing device to enable the additional computing device to evaluate whether the URL represents a potential security risk. Exemplary system 100 may also include a verification module 110 programmed to use the reputation rating of the URL to verify the accuracy of a separate trustworthiness classification assigned to the URL.

In addition, exemplary system 100 may include a client-side security module 112 programmed to (1) detect an attempt to access a URL, (2) obtain a reputation rating for the URL from a reputation service that is based at least in part on the computing health of at least one member of a computing community that previously accessed the URL, (3) determine, based at least in part on the reputation rating obtained from the reputation service, that the URL represents a potential security risk, and then (4) block the attempt to access the URL. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(1)-(N) and/or reputation service 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, and as will be explained in greater detail below, database 120 may be configured to store URL access lists 122, URL reputation ratings 124, and computing-health scores 126.

Database 120 may represent portions of a single database or computing device or a plurality of databases or computing devices. For example, database 120 may represent a portion of reputation service 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as computing devices 202(1)-(N) and/or reputation service 206 in FIG. 2, computing system 710 in FIG. 7, and/or portions of exemplary network architecture 800 in FIG. 8.

Figure 2:
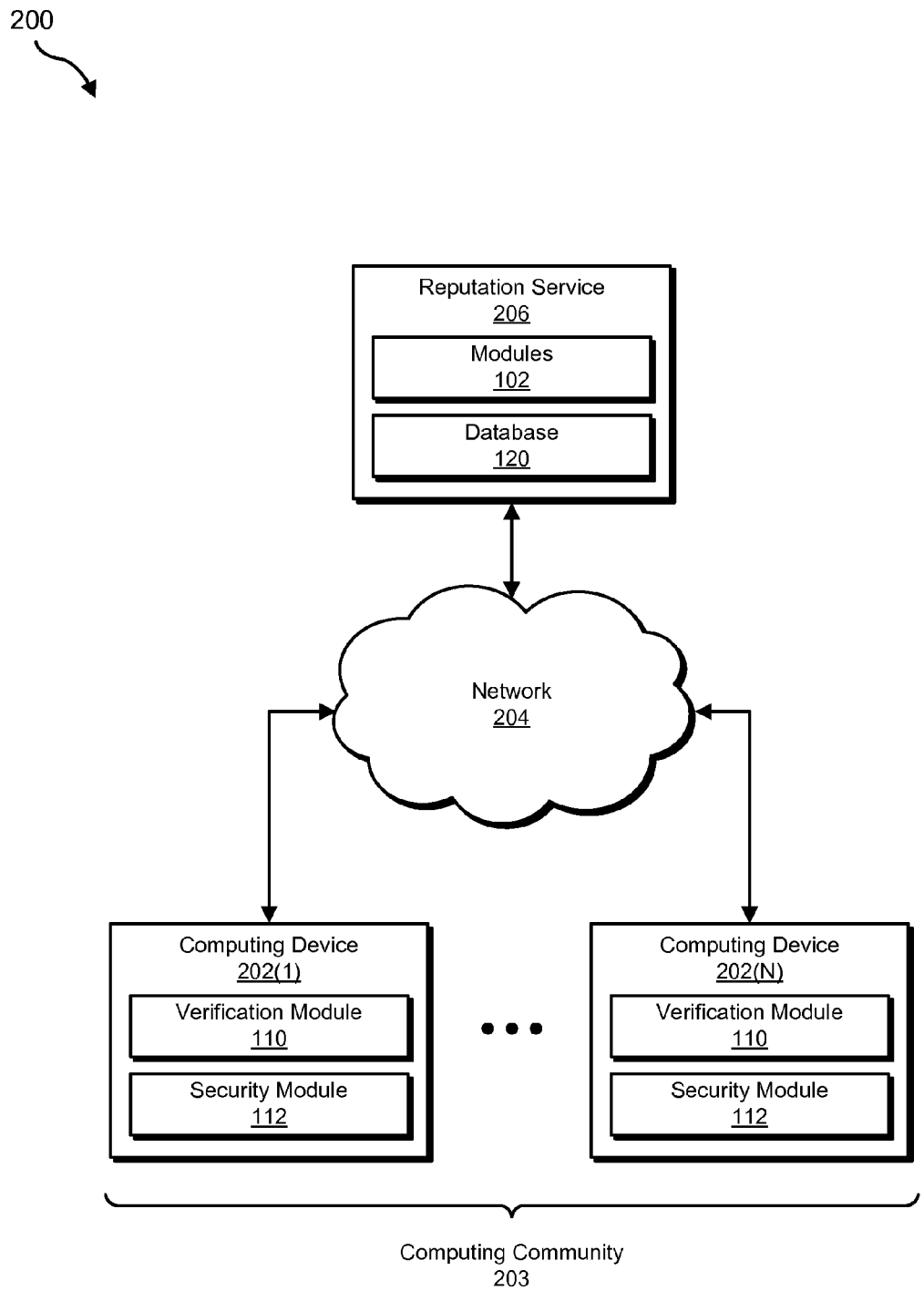
FIG. 2 is a block diagram of an exemplary system for generating reputation ratings for URLs.

Exemplary system 100 in FIG. 1 may be deployed in a variety of ways. For example, all or a portion of exemplary system 100 may represent portions of exemplary system 200 in FIG. 2. As shown in FIG. 2, system 200 may include a plurality of computing devices 202(1)-(N) in communication with a reputation service 206 via a network 204. In one embodiment, and as will be described in greater detail below, modules 102 from FIG. 1 may program reputation service 206 to generate reputation ratings for URLs by (1) identifying a URL, (2) identifying the computing health of at least one member within a computing community (e.g., computing community 203) that has accessed the URL, (3) generating, based at least in part on the computing health of the identified community member(s), a reputation rating for the URL that indicates whether the URL represents a potential security risk, and then (4) providing the reputation rating for the URL to at least one additional computing device to enable the additional computing device to evaluate whether the URL represents a potential security risk.

Computing devices 202(1)-(N) generally represent any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device. In one example, computing devices 202(1)-(N) may represent all or a portion of a computing community, such as computing community 203, which may represent the user base of a security-software publisher.

Reputation service 206 generally represents any type or form of computing device that is capable of generating and/or providing reputation ratings for URLs. Examples of reputation service 206 include, without limitation, application servers and database servers configured to provide various database services and/or run certain software applications. In some examples, reputation service 206 may be managed by a security-software publisher.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing devices 202(1)-(N) and reputation service 206.

Figure 3:
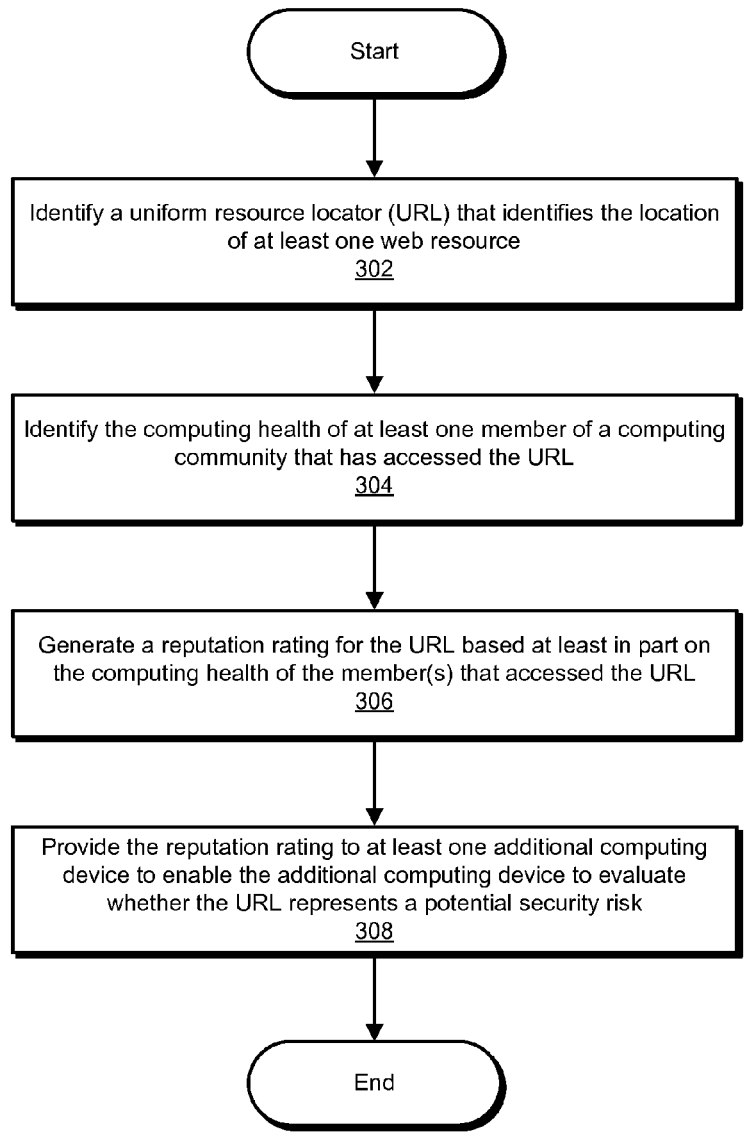
FIG. 3 is a flow diagram of an exemplary method for generating reputation ratings for URLs.
Figure 4:
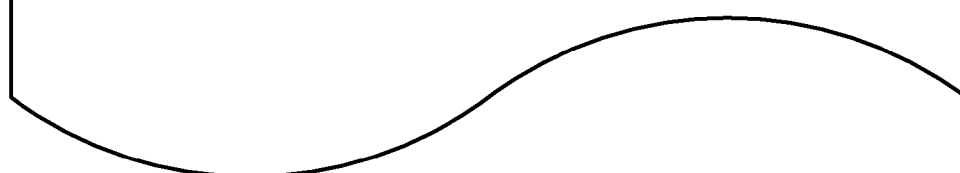
FIG. 4 is an illustration of an exemplary list that identifies each member within a computing community known to have accessed a particular URL.

FIG. 3 is a flow diagram of an exemplary computer-implemented method 300 for generating reputation ratings for URLs. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 the systems described herein may identify a URL that identifies the location of at least one web resource. For example, identification module 104 in FIG. 1 may, as part of reputation service 206 in FIG. 2, identify a URL encountered by one or more computing devices within computing community 203.

The systems described herein may perform step 302 in a variety of ways. In one example, reputation service 206 may receive a request for a reputation rating for a URL encountered by a computing device within computing community 203. In this example, identification module 104 may perform step 302 by identifying the URL identified in the computing device's request. In another example, identification module 104 may perform step 302 by identifying a URL contained within a URL log file obtained from a community member that identifies URLs accessed by the community member, as explained in greater detail below. Identification module 104 may also perform step 302 by actively crawling the web in an attempt to identify new URLs.

As used herein, the term "uniform resource locator" (or simply "URL") may refer to any type or form of mechanism for identifying the location of one or more web resources. In addition, the term "web resource," as used herein, may refer to any type or form of object that is web-identifiable and/or web-accessible. In one example, a web resource may represent a file, such as a document, image, executable file, webpage (such as an HTML or XHTML file), script, or the like. In other examples, a web resource may simply refer to a directory of additional web resources.

Returning to FIG. 3, at step 304 the systems described herein may identify the computing health of at least one member of the computing community that has accessed the URL in question. For example, reputation module 106 in FIG. 1 may, as part of reputation service 206 in FIG. 2, identify the computing health of each member of computing community 203 known to have accessed the URL identified in step 302.

The systems described herein may identify community members that have accessed the URL identified in step 302 in a variety of ways. In one example, reputation module 106 may, as part of reputation service 206 in FIG. 2, retrieve a URL access list (e.g., URL access list 422 in FIG. 4) for the URL in question from database 120 that identifies each member of computing community 203 known to have accessed the URL. In the example illustrated in FIG. 4, and as will be explained in greater detail below, URL access list 422 may identify the account ID and computing health of each member within computing community 203 known to have accessed the URL "www.newurl.com/newlink."

In some examples, the systems described herein may generate access lists (such as URL access lists 122 within database 120 in FIG. 1) for URLs by collecting, aggregating, and analyzing URL log files from thousands or potentially millions of users within a computing community (such as the user base of a security-software publisher). For example, security software installed on the computing system of each member within the user base of a security-software publisher may track and record each URL accessed (e.g., each webpage visited) by the community member in question within a URL log file. The security software may then transmit (e.g., on a periodic basis) this URL log file to reputation service 206, which may in turn update URL access lists 122 based on the information contained within the URL log file (by, e.g., updating an existing URL access list to include an indication that the community member in question accessed a URL associated with the existing URL access list or by creating a new URL access list for a new URL accessed by the community member that has not been previously accessed by community members). In this example, by collecting, aggregating, and analyzing URL log files from thousands or potentially millions of users within a computing community (such as the user base of a security-software publisher), reputation service 206 may create a database of URL access lists 122 that identify each URL visited by members within the computing community and, for each URL, each community member known to have accessed that particular URL.

Upon identifying one or more members of computing community 203 that have accessed the URL in question, reputation module 106 may identify the computing health of at least one of these members. The term "computing health," as used herein, may refer to the overall wellness (i.e., performance, stability, and/or state of security) of a computing system. In some examples, the computing health of the computing system may be quantified as a numeric score. Examples of such computing-health scores include, without limitation, a number on a scale (e.g., 70, on a scale of 1 to 100), a number representing a percentage of health (e.g., 70%, on a scale of 0 to 100%), or any other quantifier that may be used to express the health of a computing system.

Reputation module 106 may identify the computing health of a community member that has accessed the URL identified in step 302 in a variety of ways. In one example, reputation module 106 may identify at least one computing-health score assigned to the member in question. In some examples, reputation module 106 may obtain this computing-health score from a reputation service or from security software installed on the computing system of the member in question.

In another example, reputation module 106 may generate this computing-health score for the member in question. For example, reputation module 106 may generate a computing-health score for a member of computing community 203 based at least in part on the results of one or more computing-health assessments obtained from, and administered by, software installed on a computing system of the member in question. For example, security software installed on computing device 202(1) in FIG. 2 may assess the computing health of computing device 202(1) by evaluating the performance, stability, and/or state of security of computing device 202(1). FIG. 5 illustrates the results of such an exemplary computing-health assessment.

As illustrated in FIG. 5, computing-health assessment 500 may include the results of various metrics used to measure the performance, stability, and/or state of security of the computing system in question. For example, security information 510 may include a plurality of security metrics 512 and results 514 for each of these metrics. Security metrics 512 generally represent any type of metric that may be used to measure or quantify the state of security of a computing system. Examples of values that security metrics 512 may measure include, without limitation, the number of malware items that were detected, quarantined, and/or removed during a computing-health assessment period, and/or any other measurement that may be indicative of the overall state of security of a computing system.

Similarly, performance information 520 may include a plurality of performance metrics 522 and results 524 for each of these metrics. Performance metrics 522 may include any type of metric that may be used to measure the performance of a computing system. Examples of values that performance metrics 522 may measure include, without limitation, CPU usage of the computing system during the evaluation period, the number of page faults experienced by the computing system during the evaluation period, network usage of the computing system during the evaluation period (such as a running average of the number of IP datagrams sent or received by the computing system during the evaluation period), and memory usage of the computing system during the evaluation period.

In addition, stability information 530 may include a plurality of stability metrics 532 and results 534 for each of these metrics. Stability metrics 532 may include any type or form of metric that may be used to measure the stability of a computing system. Examples of values that stability metrics may measure include, without limitation, operating-system errors (such as blue-screen errors), application errors (such as application hangs or freezes), service errors, device-driver errors, system uptime, and system reboots (such as the number of system reboots per day).

In one example, reputation module 106 may quantify the health of the computing system in question by calculating an overall computing-health score for the computing system based on the information contained within computing-health assessment 500 in FIG. 5. For example, reputation module 106 may (1) assign weighted values to each of metrics 512, 522, and 532, (2) respectively apply these weighted values to the results 514, 524, and 534 of these metrics, and then (3) sum these weighted results to arrive at an overall computing-health score.

In some examples, a computing-health score may also include a plurality of quantifiers that are based on all or part of a system-health assessment (e.g., computing-health assessment 500 in FIG. 5). For example, a system-health score may include results from computing-health assessment 500, a performance score, a stability score, a security score, and/or any other value that may quantify or express the computing health of a computing system.

Returning to FIG. 3, at step 306 the systems described herein may generate a reputation rating for the URL based at least in part on the computing health of the community member that accessed the URL. For example, reputation module 106 in FIG. 1 may, as part of reputation service 206 in FIG. 2, generate a reputation rating for the URL identified in step 302 based at least in part on the computing health of the community member that accessed the URL, as identified in step 304.

The term "reputation rating," as used herein, generally refers to information that indicates whether a URL represents a potential security risk. An example of a reputation rating includes, without limitation, a reputation score (e.g., 70, on a scale of 1 to 100, where, for example, a high reputation score indicates that the URL is unlikely to represent a security risk and a low reputation score indicates that the URL likely represents a security risk).

The systems described herein may generate a reputation rating for a URL in step 306 in a variety of ways. As detailed above, in one example reputation module 106 may generate a reputation rating for a URL based at least in part on the computing health of each member within the computing community that has accessed the URL, as identified in step 304. For example, the systems described herein may generate a reputation rating for the URL by simply averaging the computing-health scores of each member that has accessed the URL in question. For example, reputation module 106 may simply average the computing-health scores of each member identified within URL access list 422 (which, as detailed above, identifies each member within computing community 203 that has accessed the URL "www.newurl.com/newlink"), resulting in a reputation rating of 17.67% for the URL "www.newurl.com/new." In this example, this relatively low reputation rating may indicate that the URL in question likely represents a potential security risk since, at least in this example, the URL is prominently accessed by at-risk or "unhealthy" members within computing community 203.

In another example, the systems described herein may generate a reputation rating for the URL in question by (1) weighting both the computing-health scores identified in step 304 and a number of additional factors that may be relevant to determining whether the URL represents a potential security risk and then (2) summing the weighted results of the same to arrive at a reputation rating for the URL. Examples of additional factors that may be included in such a weighted computation include, without limitation, the total number of members within the computing community that have accessed the URL in question (where, e.g., a relatively low number, such as less than 10, may indicate that the URL is potentially malicious), the age of the URL (where, e.g., a relatively new URL may indicate that the URL is potentially malicious), at least one attribute of a web domain associated with the URL (such as the reputation of a top-level domain associated with the URL, where a relatively low reputation of the top-level domain may indicate that the URL is potentially malicious), at least one attribute of the web resource or resources identified by the URL (such as a trustworthiness classification or reputation rating assigned to a file identified by the URL, where a low reputation assigned to the file may indicate that the URL is potentially malicious), at least one attribute of a server associated with the URL (such as a reputation rating assigned to a domain name server associated with the URL, where a low reputation rating of the domain name server may indicate that the URL is potentially malicious), at least one attribute of a registrar associated with the URL (such as a reputation rating of a registrar of the URL, where a low reputation rating of the registrar may indicate that the URL is potentially malicious), or any other factor or attribute that may be useful in determining whether the URL represents a potential security risk.

Returning to FIG. 3, at step 308 the systems described herein may provide the reputation rating for the URL to at least one additional computing device to enable the additional computing device to evaluate whether the URL represents a potential security risk. For example, communication module 108 in FIG. 1 may, as part of reputation service 206 in FIG. 2, provide the reputation rating generated in step 306 to one or more members of computing community 203 to enable these members to evaluate whether the URL identified in step 302 represents a potential security risk.

The systems described herein may perform step 308 in a variety of ways. In one example, communication module 108 may provide the reputation rating generated in step 306 in response to a request for the same from one or more members of computing community 203. In another example, communication module 108 may automatically deploy this reputation rating to one or more members of computing community 203 as part of a scheduled signature or heuristic-update deployment process. Upon completion of step 308, exemplary method 300 in FIG. 3 may terminate.

In some examples, the systems described herein may use the reputation rating generated in step 306 to verify the accuracy of a separate trustworthiness classification assigned to the URL in question (such as a trustworthiness classification assigned to the URL using a signature and/or heuristic-based approach). For example, verification module 110 may verify the accuracy of a trustworthiness classification assigned to a URL that was based at least in part on the static analysis of at least one attribute of the URL. Examples of the types of attributes that may have been analyzed during such a classification include, without limitation, the age of the URL in question, at least one attribute of a web domain associated with the URL in question, at least one attribute of the web resource or resources identified by the URL in question, at least one attribute of a server associated with the URL in question, at least one attribute of the registrar associated with the URL in question, and/or any other attribute that may be useful in determining whether a URL represents a potential security risk. In this example, by comparing the reputation rating generated in step 306 with the separate trustworthiness classification, the potential for and/or frequency of false positives generated by each approach may be reduced.

As detailed above, by collecting, aggregating, and analyzing data relative to URLs accessed by potentially millions of user devices within a computing community, such as a security-software vendor's user base (for example, by determining whether a URL has been accessed by a relatively low number of machines within the community or whether the URL has been predominantly accessed by at-risk or "unhealthy" machines within the community, among other details), the systems and methods described herein may enable security-software publishers to generate reputation ratings for URLs that provide fairly accurate estimations as to whether the URLs represent potential security risks. Moreover, by comparing such reputation ratings with separate URL trustworthiness classifications (generated using, e.g., signature or heuristic-based classification techniques), the potential for and/or frequency of false positives generated by each technique may be reduced.

Figure 6:
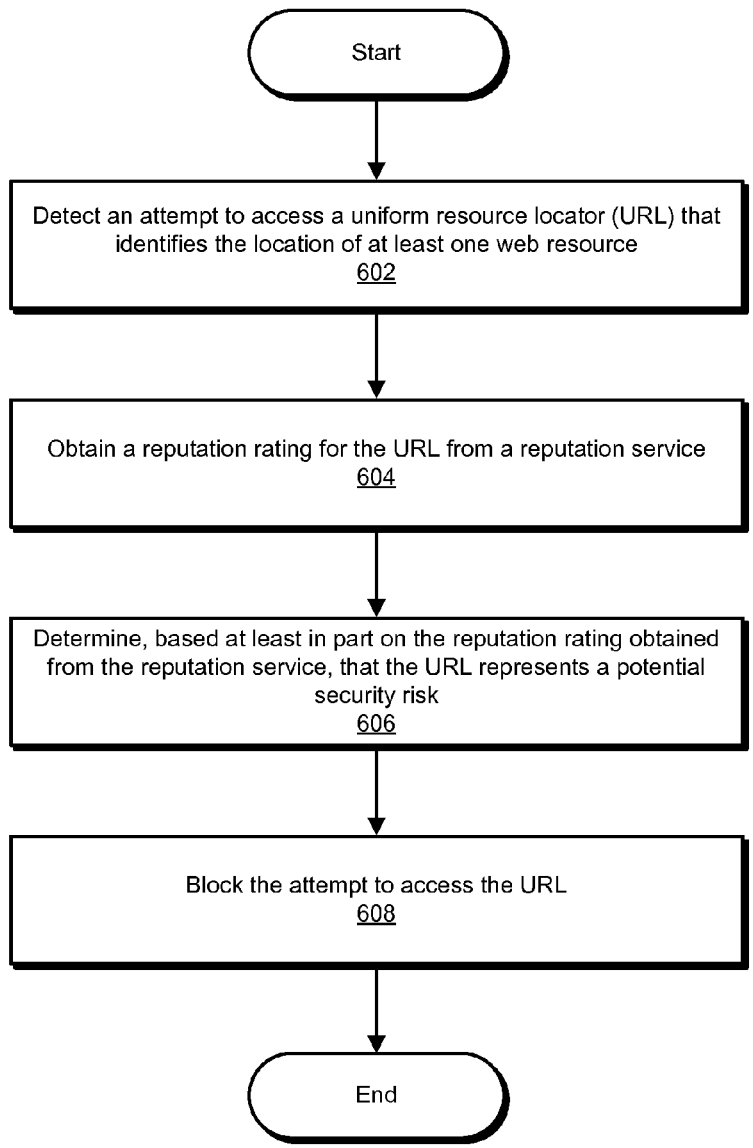
FIG. 6 is a flow diagram of an exemplary client-side method for determining whether URLs represent potential security risks.

FIG. 6 is a flow diagram of an exemplary client-side, computer-implemented method 600 for using reputation ratings generated in accordance with the steps outlined in FIG. 3 to determine whether URLs represent potential security risks. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 710 in FIG. 7, and/or portions of exemplary network architecture 800 in FIG. 8.

As illustrated in FIG. 6, at step 602 the systems described herein may detect an attempt to access a URL that identifies the location of at least one web resource. For example, security module 112 in FIG. 1 may, as part of computing device 202(N) in FIG. 2, detect an attempt by computing device 202(N) to access a URL.

The systems described herein may perform step 602 in a variety of ways. In one example, security module 112 may represent security software (such as a browser-based toolbar or standalone security-software suite) configured to detect attempts to access URLs by applications running on, or devices connected to, computing device 202(N).

At step 604, the systems described herein may obtain a reputation rating for the URL from a reputation service. For example, security module 112 in FIG. 1 may, as part of computing device 202(N) in FIG. 2, obtain a reputation rating for the URL identified in step 602 from reputation service 206.

In some examples, the reputation rating obtained at step 604 may represent a reputation rating generated in accordance with the steps outlined in connection with exemplary method 300 in FIG. 3. As such, and as detailed above, this reputation rating may indicate whether the URL in question represents a potential security risk and may be based at least in part on the computing health of at least one member of a computing community that has previously accessed the URL.

At step 606, the systems described herein may determine, based at least in part on the reputation rating obtained from the reputation service, that the URL represents a potential security risk. For example, security module 112 in FIG. 1 may, as part of computing device 202(N) in FIG. 2, determine that the URL identified in step 602 represents a potential security risk if the URL identified in step 602 has a relatively low reputation rating.

The systems described herein may perform step 606 in any number of ways. In some examples, security module 112 may determine that the URL in question represents a potential security risk if the reputation rating obtained from reputation service 206 falls below a predetermined threshold (e.g., "50%"). In other examples, security module 112 may use the reputation rating obtained from reputation service 206 in combination with a separate trustworthiness classification assigned to the URL in question (such as a trustworthiness classification assigned to the URL using a signature and/or heuristic-based approach) to determine whether the URL represents a potential security risk. For example, and as detailed above in connection with exemplary method 300 in FIG. 3, verification module 110 may use the reputation rating obtained from reputation service 206 to verify the accuracy of a separate trustworthiness classification assigned to the URL that was based at least in part on a static analysis of at least one attribute of the URL (such as the URL's content). In this example, by comparing the reputation rating obtained in step 604 with the separate trustworthiness classification, the potential for and/or frequency of false positives generated by each approach may be reduced.

At step 608, the systems described herein may block the attempt to access the URL. For example, security module 112 in FIG. 1 may, as part of computing device 202(N) in FIG. 2, block the attempt to access the URL identified in step 602 upon determining that the URL represents a potential security risk in step 606. Upon completion of step 608, exemplary method 606 in FIG. 6 may terminate.

As detailed above, by deploying reputation ratings generated in accordance with the steps outlined herein to security software residing on end-users' machines, the systems and methods described herein may enable security software to reliably detect and block access to malicious URLs encountered by end-users, even if a particular end-user represents one of the first (or the first) end-user to encounter a particular URL.

Figure 7:
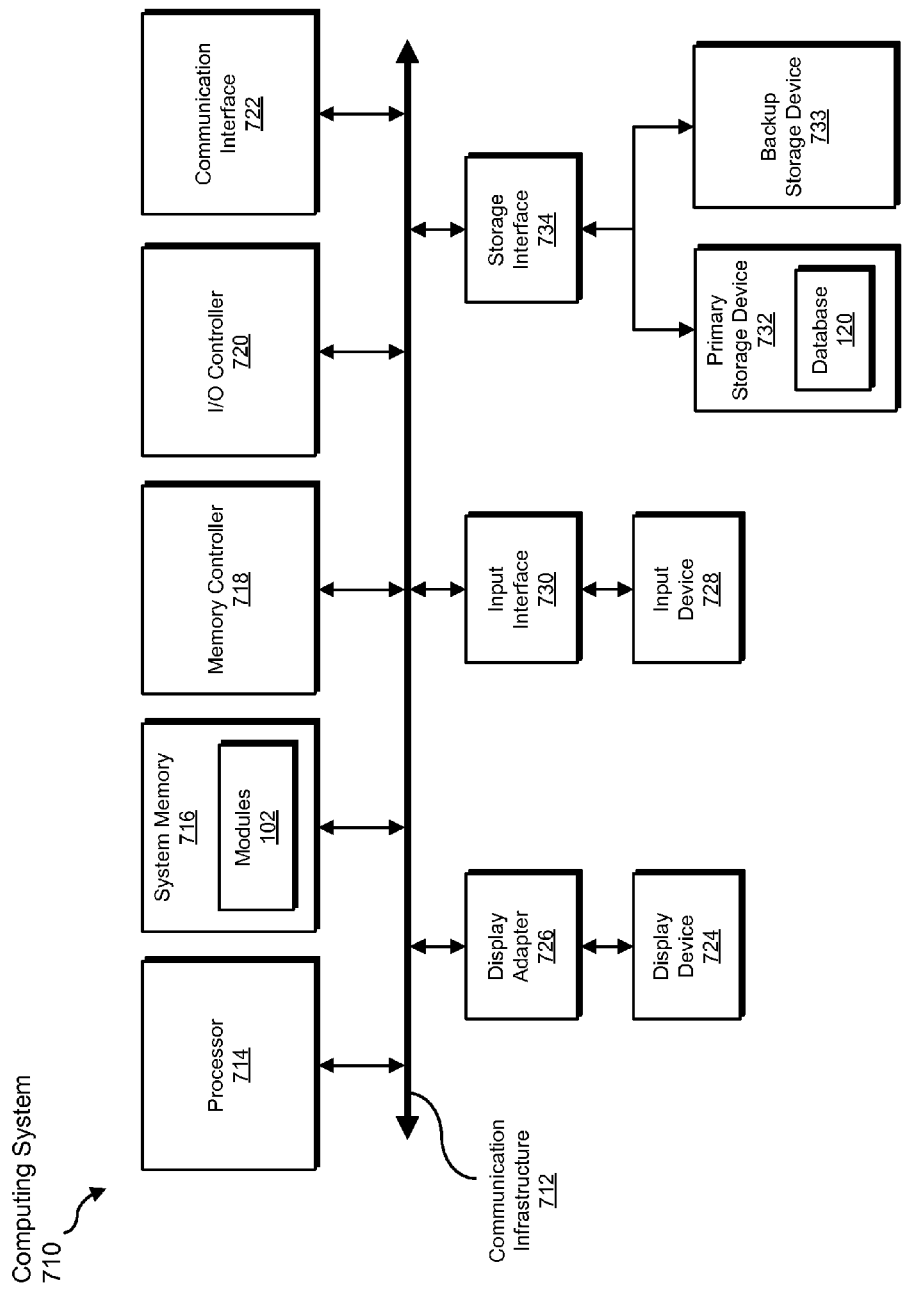
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, generating, providing, evaluating, detecting, obtaining, determining, blocking, and verifying steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, generating, providing, evaluating, detecting, obtaining, determining, blocking, and verifying.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, generating, providing, evaluating, detecting, obtaining, determining, blocking, and verifying steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, generating, providing, evaluating, detecting, obtaining, determining, blocking, and verifying steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, generating, providing, evaluating, detecting, obtaining, determining, blocking, and verifying steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, generating, providing, evaluating, detecting, obtaining, determining, blocking, and verifying steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
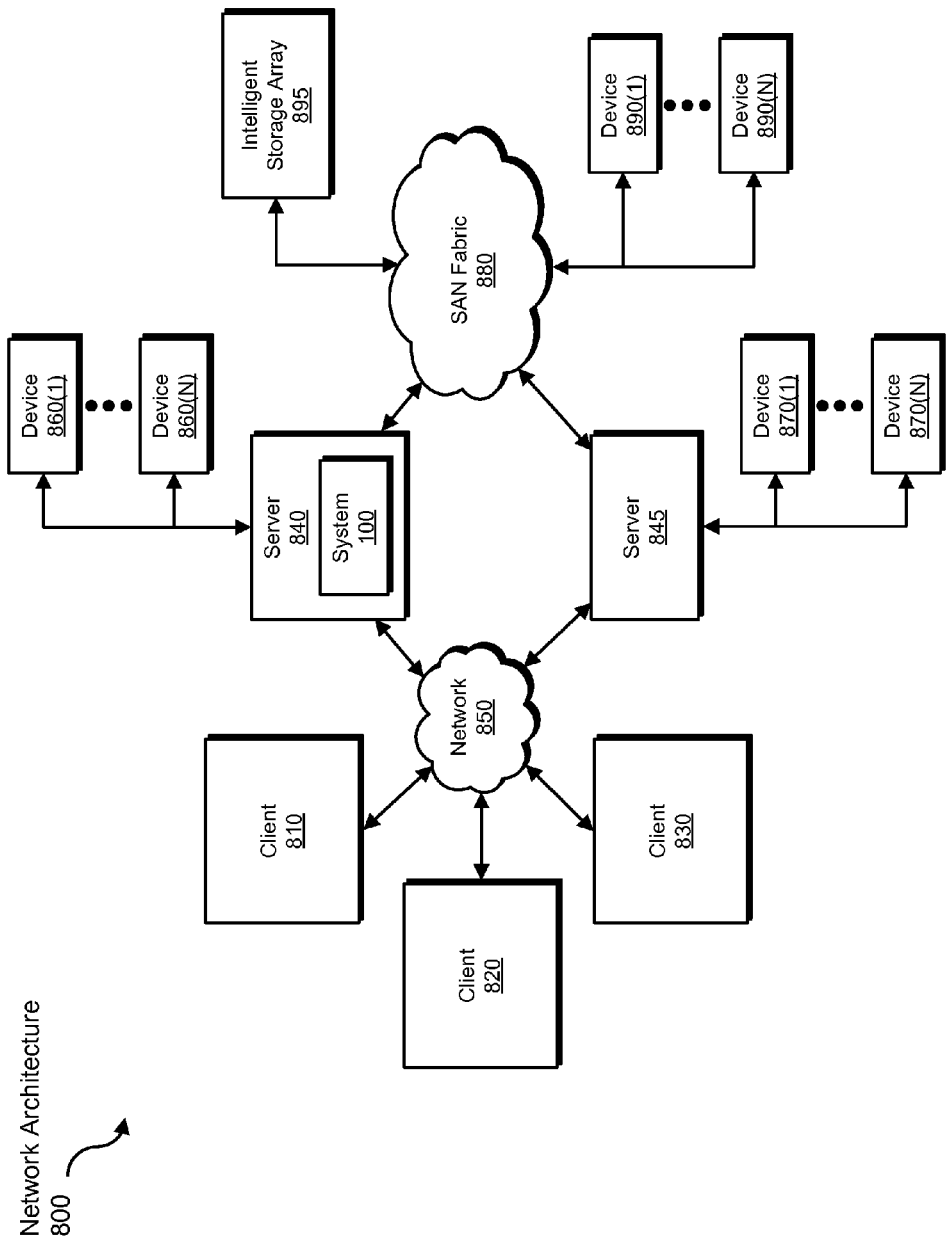
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, generating, providing, evaluating, detecting, obtaining, determining, blocking, and verifying steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for generating reputation ratings for URLs that includes (1) identifying a URL that identifies the location of at least one web resource, (2) identifying the computing health of at least one member of a computing community that has accessed the URL, (3) generating a reputation rating for the URL based at least in part on the computing health of the member that accessed the URL, wherein the reputation rating for the URL indicates whether the URL represents a potential security risk, and then (4) providing the reputation rating for the URL to at least one additional computing device to enable the additional computing device to evaluate whether the URL represents a potential security risk.

In one embodiment, the web resource may represent a file. In addition, in some examples identifying the computing health of the member that accessed the URL may include identifying at least one computing-health score assigned to the member that accessed the URL. In these examples, the computing-health score assigned to the member that accessed the URL may be based at least in part on an evaluation of the performance, stability, and/or state of security of at least one computing device of the member.

In one example, generating the reputation rating for the URL may further include generating the reputation rating for the URL based at least in part on the number of members within the computing community that have accessed the URL, the age of the URL, at least one attribute of a web domain associated with the URL, at least one attribute of the web resource identified by the URL, at least one attribute of a server associated with the URL, and/or at least one attribute of a registrar associated with the URL.

The method may also include using the reputation rating of the URL to verify the accuracy of a separate trustworthiness classification assigned to the URL that is based at least in part on an analysis of at least one attribute of the URL. In this example, the attribute of the URL may include the age of the URL, at least one attribute of a web domain associated with the URL, at least one attribute of the web resource identified by the URL, at least one attribute of a server associated with the URL, and/or at least one attribute of a registrar associated with the URL.

Computing system 710 and/or one or more components of network architecture 800 may also perform and/or be a means for performing, either alone or in combination with other elements, one or more steps of an exemplary method for determining whether URLs represent potential security risks that includes (1) detecting an attempt to access a URL that identifies the location of at least one web resource, (2) obtaining a reputation rating for the URL from a reputation service, wherein the reputation rating for the URL indicates whether the URL represents a potential security risk and is based at least in part on the computing health of at least one member of a computing community that previously accessed the URL, (3) determining, based at least in part on the reputation rating obtained from the reputation service, that the URL represents a potential security risk, and then (4) blocking the attempt to access the URL. This method may also include using the reputation rating obtained from the reputation service to verify the accuracy of a separate trustworthiness classification assigned to the URL that is based at least in part on an analysis of at least one attribute of the URL.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 in FIG. 1 may transform reputation service 206 into a device capable of generating reputation ratings for URLs that are based at least in part on the computing health of members within a computing community that have previously accessed the URLs.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for generating reputation-based ratings for uniform resource locators, at least a portion of the method being performed by a reputation server comprising at least one processor, the method comprising:
   identifying, by the reputation server, a uniform resource locator (URL) that identifies the location of at least one web resource;
   identifying, by the reputation server, at least one numeric computing-health score assigned to at least one computing device within a computing community that has previously accessed the URL;
   identifying, by the reputation server, a number of computing devices within the computing community that have previously accessed the URL;
   generating, by the reputation server, a reputation rating for the URL by:
      weighting the numeric computing-health score assigned to the computing device that has previously accessed the URL;
      weighting the number of computing devices within the computing community that have previously accessed the URL;
      generating the reputation rating for the URL based at least in part on the weighted numeric computing-health score assigned to the computing device and the weighted number of computing devices within the computing community that have previously accessed the URL, wherein the reputation rating for the URL indicates whether the URL represents a potential security risk;
   providing, by the reputation server, the reputation rating for the URL to at least one additional computing device to enable the additional computing device to evaluate whether the URL represents the potential security risk.

2. The computer-implemented method of claim 1, wherein the web resource comprises a file.

3. The computer-implemented method of claim 1, wherein the numeric computing-health score assigned to the computing device that previously accessed the URL is based at least in part on at least one of:
   an evaluation of the performance of the computing device;
   an evaluation of the stability of the computing device;
   an evaluation of the state of security of the computing device.

4. The computer-implemented method of claim 1, wherein generating the reputation rating for the URL further comprises generating the reputation rating for the URL based at least in part on at least one of:
   the age of the URL;
   at least one attribute of a web domain associated with the URL;
   at least one attribute of the web resource identified by the URL;
   at least one attribute of a server associated with the URL;
   at least one attribute of a registrar associated with the URL.

5. The computer-implemented method of claim 1, further comprising using, by the reputation server, the reputation rating of the URL to verify the accuracy of a separate trustworthiness classification assigned to the URL, wherein the separate trustworthiness classification assigned to the URL is based at least in part on an analysis of at least one attribute of the URL.

6. The computer-implemented method of claim 5, wherein the attribute of the URL comprises at least one of:
   the age of the URL;
   at least one attribute of a web domain associated with the URL;
   at least one attribute of the web resource identified by the URL;
   at least one attribute of a server associated with the URL;
   at least one attribute of a registrar associated with the URL.

7. The computer-implemented method of claim 1, wherein identifying the numeric computing-health score assigned to the computing device within the computing community that previously accessed the URL comprises:
   retrieving a list that identifies a plurality of computing devices known to have accessed the URL within the computing community;
   identifying a numeric computing-health score assigned to each of the plurality of computing devices identified in the list.

8. The computer-implemented method of claim 7, wherein retrieving the list that identifies the plurality of computing devices known to have accessed the URL within the computing community comprises:
   collecting, from the plurality of computing devices, a plurality of log files that identify each URL accessed by the plurality of computing devices over a period of time;
   updating the list to indicate that the plurality of computing devices within the computing community have accessed the URL.

9. The computer-implemented method of claim 8, wherein collecting the plurality of log files from the plurality of computing devices comprises receiving the plurality of log files from security software that tracked and recorded each URL accessed by the plurality of computing devices over the period of time.

10. The computer-implemented method of claim 1, wherein the computing community comprises a plurality of computing devices that represent a user base of a security-software publisher.

11. The computer-implemented method of claim 1, wherein generating the reputation rating for the URL further comprises summing the weighted numeric computing-health score and the weighted number of computing devices to arrive at the reputation rating for the URL.

12. A system for generating reputation ratings for uniform resource locators, the system comprising:
   an identification module programmed to identify a uniform resource locator (URL) that identifies the location of at least one web resource;
   a reputation module programmed to:
      identify a numeric computing-health score assigned to at least one computing device within a computing community that has previously accessed the URL;
      identify a number of computing devices within the computing community that have previously accessed the URL;
      generate a reputation rating for the URL by:
         weighting the numeric computing-health score assigned to the computing device that has previously accessed the URL;
         weighting the number of computing devices within the computing community that have previously accessed the URL;
         generating the reputation rating for the URL based at least in part on the weighted numeric computing-health score assigned to the computing device and the weighted number of computing devices within the computing community that have previously accessed the URL, wherein the reputation rating for the URL indicates whether the URL represents a potential security risk;
   a communication module programmed to provide the reputation rating for the URL to at least one additional computing device to enable the additional computing device to evaluate whether the URL represents the potential security risk;
   at least one processor configured to execute at least one of the identification module, the reputation module, and the communication module.

13. The system of claim 12, wherein the numeric computing-health score assigned to the computing device that previously accessed the URL is based at least in part on at least one of:
   an evaluation of the performance of the computing device;
   an evaluation of the stability of the computing device;
   an evaluation of the state of security of the computing device.

14. The system of claim 12, wherein the reputation module generates the reputation rating for the URL further based at least in part on at least one of:
   the age of the URL;
   at least one attribute of a web domain associated with the URL;
   at least one attribute of the web resource identified by the URL;
   at least one attribute of a server associated with the URL;
   at least one attribute of a registrar associated with the URL.

15. The system of claim 12, further comprising a verification module programmed to use the reputation rating of the URL to verify the accuracy of a separate trustworthiness classification assigned to the URL, wherein the separate trustworthiness classification assigned to the URL is based at least in part on an analysis of at least one attribute of the URL.

16. The system of claim 15, wherein the attribute of the URL comprises at least one of:
   the age of the URL;
   at least one attribute of a web domain associated with the URL;
   at least one attribute of the web resource identified by the URL;
   at least one attribute of a server associated with the URL;
   at least one attribute of a registrar associated with the URL.

17. A computer-implemented method for determining whether uniform resource locators represent potential security risks, at least a portion of the method being performed by a computing device comprising at least one processor, the method comprising:
   detecting, by the computing device, an attempt to access a uniform resource locator (URL) that identifies the location of at least one web resource;
   obtaining, by the computing device, a reputation rating for the URL from a reputation service, wherein the reputation rating for the URL is generated by:
      weighting a numeric computing-health score assigned to at least one additional computing device within a computing community that previously accessed the URL;

weighting a number of computing devices within the computing community that have previously accessed the URL;

generating the reputation rating for the URL based at least in part on the weighted numeric computing-health score assigned to the computing device and the weighted number of computing devices within the computing community that have previously accessed the URL, wherein the reputation rating for the URL indicates whether the URL represents a potential security risk;

determining, by the computing device, that the URL represents the potential security risk based at least in part on the reputation rating;

blocking, by the computing device, the attempt to access the URL.

18. The computer-implemented method of claim 17, wherein the reputation rating obtained from the reputation service is further based at least in part on at least one of:
   the age of the URL;
   at least one attribute of a web domain associated with the URL;
   at least one attribute of the web resource identified by the URL;
   at least one attribute of a server associated with the URL;
   at least one attribute of a registrar associated with the URL.

19. The computer-implemented method of claim 17, further comprising using, by the computing device, the reputation rating obtained from the reputation service to verify the accuracy of a separate trustworthiness classification assigned to the URL, wherein the separate trustworthiness classification assigned to the URL is based at least in part on an analysis of at least one attribute of the URL.

* * * * *